United States Patent [19]

Fiehl

[11] 4,247,131
[45] Jan. 27, 1981

[54] POSITION-VARIABLE BELT ARTICULATION FOR SAFETY BELTS

[75] Inventor: Gerd Fiehl, Waiblingen, Fed. Rep. of Germany

[73] Assignee: Daimler-Benz Aktiengesellschaft, Fed. Rep. of Germany

[21] Appl. No.: 12,854

[22] Filed: Feb. 16, 1979

[30] Foreign Application Priority Data

Feb. 16, 1978 [DE] Fed. Rep. of Germany ....... 2806532

[51] Int. Cl.³ ...................... A62B 35/02; B60R 21/10
[52] U.S. Cl. ................................... 280/808; 280/806; 297/483
[58] Field of Search ................ 280/806, 808; 297/476, 297/479, 480, 482, 483

[56] References Cited

U.S. PATENT DOCUMENTS

| | | | |
|---|---|---|---|
| 3,964,798 | 6/1976 | Burleigh | 280/808 |
| 4,009,510 | 3/1977 | Lindblad | 297/479 |
| 4,056,282 | 11/1977 | Nordh | 297/483 |
| 4,120,466 | 10/1978 | Adomeit | 280/806 |
| 4,135,737 | 1/1979 | Scholz et al. | 280/808 |

FOREIGN PATENT DOCUMENTS

| | | | |
|---|---|---|---|
| 2551329 | 5/1977 | Fed. Rep. of Germany | 297/483 |
| 1497397 | 1/1978 | United Kingdom | 280/808 |

Primary Examiner—John J. Love
Assistant Examiner—Donn McGiehan
Attorney, Agent, or Firm—Craig & Antonelli

[57] ABSTRACT

A position-variable belt articulation apparatus for safety belts, especially for the upper, body-mounted pivot of three-point safety belts, having a clamping element adjustable along a guide, with at least one belt holder being associated with the clamping element which is tensioned against the guide by the belt as a function of the stress on the belt. The clamping element is guided in a longitudinally adjustable manner and is swivelable about an axis transverse to the direction of longitudinal adjustment. The clamping element, in one embodiment, can have clamping jaws which cooperate with the guide and which are associated with the belt holders. In another embodiment, the two clamping jaws are articulated to one another and have curved clamping surfaces for gripping the guide firmly therebetween to keep the clamping element at the appropriate height.

14 Claims, 7 Drawing Figures

POSITION-VARIABLE BELT ARTICULATION FOR SAFETY BELTS

The present invention relates to a position-variable belt articulation for safety belts, especially for the upper articulation on the car body side in case of three-point safety belts.

Due to the fact that the seats of a motor vehicle are to be adjustable over maximum ranges and belt users come in varying sizes and proportions, it is difficult to find, even for the majority of persons using the belts, a favorable disposition of the top anchoring point in case of two-point and three-point slanted shoulder belt and/or of the deflection for the shoulder belt in case of automatic belts. However, an incorrect position especially of the top articulation and/or deflection can lead not only to a person considering the safety belt uncomfortable and thus refusing to put it on, but also indirectly to danger to the person wearing the belt.

This disadvantage was sought to be overcome in a conventional construction in offenlegungschrift No. 2,625,417 by adjusting the top articulation or deflection in dependence on the position of the associated seat, which, of course, represents a rather expensive solution due to the necessary transmitting means.

In contrast thereto, the invention resides in providing a belt articulation apparatus which is especially simple in construction, can be adjusted independently and preferably also infinitely, and is readily settable, which is accomplished by providing that the articulation apparatus comprises a tightening element adjustable along a guide means. The tightening element is associated with at least one belt mounting which is biased against the guide means through the belt in dependence on the load exerted thereon along the lines of tightening of the tightening element.

In this connection, it has proven to be advantageous to fashion the guide means in the form of a guide track on which the tightening element is guided to be longitudinally displaceable and to be pivotable about an axis extending at right angles to the displacement direction and being, within the scope of this invention, optionally also an imaginary axis. In particular, the tightening element can be fashioned as a lever, one arm of which extends around a clamping jaw cooperating with the guide means and the other arm of which extends around the belt mounting, wherein the latter, which can also be fashioned as a guide eye, can be directly associated with this arm.

One embodiment of a belt articulation apparatus which, according to the invention, is especially suitable and preferred, resides in that the articulation comprises as the tightening element a tensioning clamp which includes clamping jaws cooperable with the guide means. The clamping jaws are correlated with belt mountings which can be acted upon through the belt in dependence on the load exerted on the latter, along the lines of tightening the clamping jaws against the guide means disposed between them. The belt mountings can also be fashioned as belt guide eyes in this instance and can be disposed in the guide loop of the belt. The essential feature of this arrangement is that the belt tensions the clamping jaws of the tensioning clamp with respect to each other so that a very firm anchoring action results with respect to the guide means extending between the clamping jaws. In this embodiment, the guide means accordingly need not be fashioned to be rigid itself, and thus can be constituted, for example, likewise by a belt strap. This makes it possible in a particularly simple manner to delegate to the guide means as such additional functions, and thus, for example, to fashion the guide means as an extensible member or to associate the guide means with a tightening device responding conventionally preferably in dependence on the acceleration and taking up the belt slack. Thereby it is possible, in particular, within the scope of this invention, to shift the articulation and/or the deflection of the belt in case of danger so that, for example, in spite of a position of the articulation and/or deflection adapted to the belt user's convenience, the respectively optimum position of the articulation and/or deflection from a safety viewpoint can be ensured in case of danger.

The clamping jaw has, in such an arrangement, preferably intersecting levers pivotable with respect to each other through an optionally imaginary axis. These levers are associated, on one side of the pivot axis, with the clamping jaws and, on the other side of the pivot axis, with the belt mountings, wherein at least one of them can be fashioned as a guide eye.

With a view toward arranging the belt articulation on or, to an essential part, also within the guide pillar or some other support means of the vehicle body, it proves to be advantageous if one of the levers of the clamping jaw is made to be straight and the other lever is made to be angled in the zone of the pivot axis.

Additional details and features of the invention can be seen from the claims, as well as from the subsequent description of embodiments when taken in connection with the accompanying drawings, wherein:

FIG. 1 shows a schematic side view of a belt articulation apparatus according to the present invention, wherein a tightening element of the apparatus is adjustable along a guide means;

FIG. 2 there is a schematic side view of another embodiment of a belt articulation apparatus in accordance with the present invention;

Figure 1:
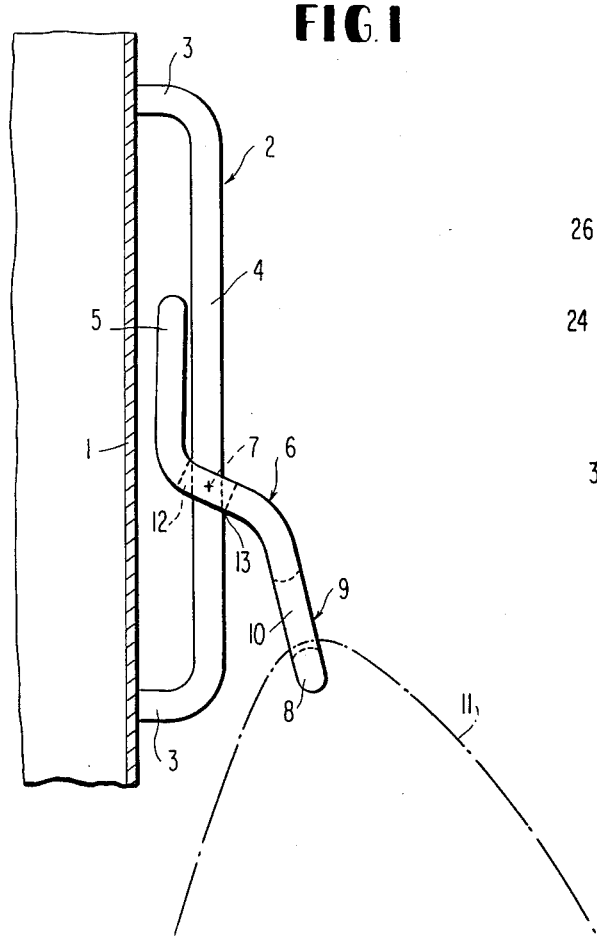
Figure 2:
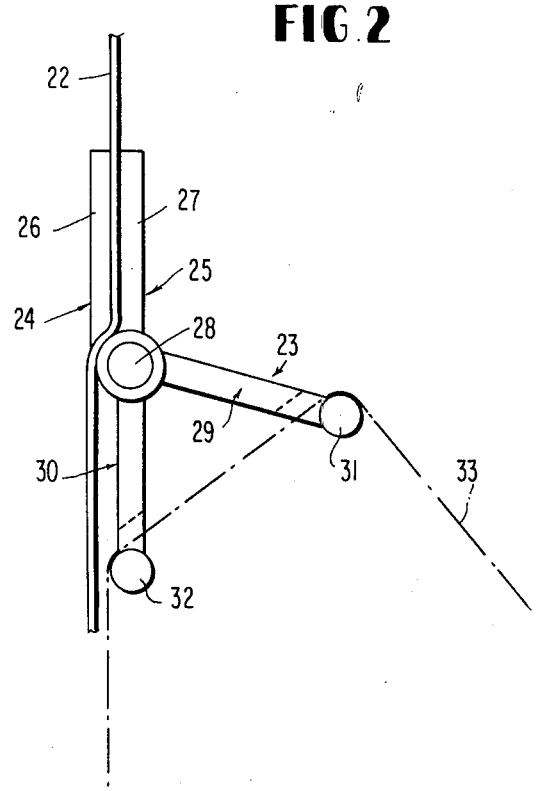
Figure 3:
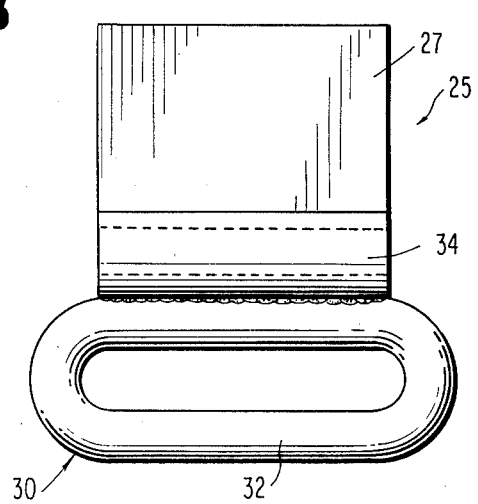
FIG. 3 is a plan view of one lever of a tensioning clamp of the apparatus of FIG. 2.

In the embodiment of a position-variable belt articulation according to the invention illustrated in FIG. 1, numeral 1 indicates schematically a support means or a pillar of the automotive vehicle, here the pillar behind the door, also called a B column, to which a guide means generally designated by the reference number 2 is attached. The guide means 2 has a bracket form and connects with the pillar 1 through legs 3. A base 4 of the guide means 2 is free-standing with respect to the pillar 1, and the clamping jaw 5 of a clamping or tightening element generally designated by the reference number 6 is located in the zone between the pillar 1 and the base 4. The clamping or tightening element 6 is fashioned as a two-armed lever and is pivotable about an imaginary axis 7 with respect to the guide means 2. The clamping jaw 5 forms one of the lever arms of the tightening element 6 with the other lever arm 8 being disposed opposite the axis 7. A belt mounting generally designated by the reference number 9 is provided at the lever arm 8. The belt mounting 9 is formed on an eye 10 associated with the lever arm 8 with safety belt 11, indicated in dot-dash lines, extending through the eye 10 with its upper guide loop.

In the illustrated schematic view, the guide base extends through a cutout 12 in an angled transition zone of the tightening element 6. The cutout 12 is dimensioned so that, on the one hand, a certain pivotal motion of the tightening element 6 with respect to the guide means 2 is possible, and, on the other hand, in the illustrated tensioned position, a corresponding supporting action is provided through the edge 13 in case of a tensile stress applied by way of the belt 11, so that the clamping jaw 5 is tensioned with respect to the base 4 of the guide means 2 in dependence on the load on the belt 11.

In a deviation from the illustrated embodiment, it is, of course, also possible to provide an actual pivot axle which is mounted to be correspondingly longitudinally displaceable with respect to the guide means 2.

To exclude unintended shifting of the tightening element 6 with respect to the guide means 2, a resilient support of the tightening element against the guide means 2 can be provided in a manner not illustrated in detail. By way of such a resilient support, it is ensured, then, that on the one hand the clamping or tightening element 6 can be arbitrarily displaced with respect to the guide means 2, but on the other hand an unintended shifting is impossible. This holds true also, in particular, for the case where the belt 11 is stressed, since in this case, in correspondence with the illustrated guide relationships, the tightening force increases with an increasing stress on the belt 11.

Within the scope of the invention it is, of course, possible to associate with the guide means 2 and/or with the clamping jaw 5 supports or surface structures ensuring an improved force-derived connection or optionally also a certain shape-mating connection.

In the embodiment according to FIGS. 2–6, a guide means 22 is utilized which is constituted, in the illustrated example, by a belt strap attached, in a way not illustrated in detail, to the middle pillar or with respect to other parts of a clamping or vehicle body. As the tightening element generally designated by the reference number 23, a tensioning clamp engages oppositely to the guide means 22. The tensioning clamp includes two levers generally designated by the reference numbers 24, 25, each of which has a lever arm fashioned as a clamping jaw 26, 27 and which are pivotably interconnected via a pivot axle 28. Two other arms generally designated by the reference numbers 29, 30 of the levers 24, 25 are associated with the belt mountings 31, 32 which, as shown most clearly in FIGS. 3–6, are fashioned as eyes. A safety belt 33, illustrated in dot-dash lines, passes in a zone of its belt loop over the belt mountings 31, 32.

Figure 4:
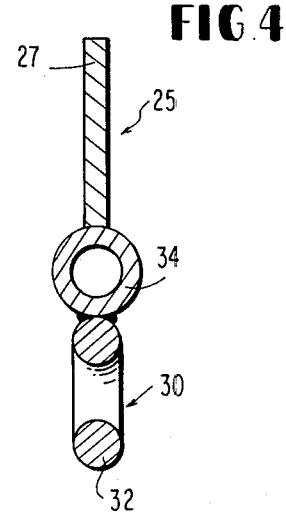
FIG. 4 is a cross-sectional side view of the lever of FIG. 3.
Figure 5:
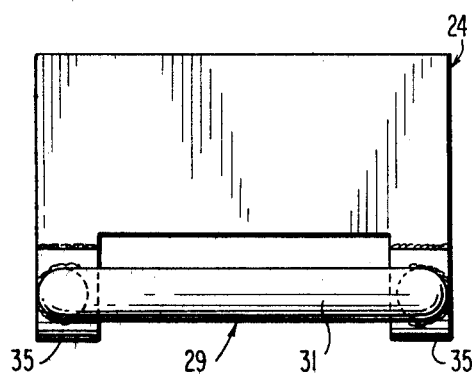
FIG. 5 is a plan view of another lever of a tensioning clamp of the apparatus of FIG. 2.
Figure 6:
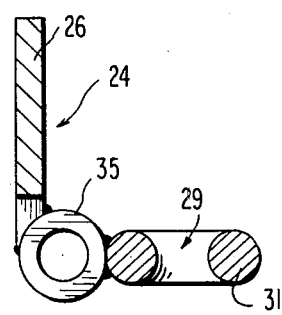
FIG. 6 is a cross-sectional side view of the lever FIG. 5.

Assuming that the guide means 22 extends along a pillar or the like, then, of levers 24, 25 in the illustrated embodiment, the lever 25 has a straight shape wherein, as shown in FIG. 4, the clamping jaw 27 and the belt mounting 32, fashioned as an eye, are practically in alignment in the lateral viewing direction. Between the two lever arms is the bushing 34 for receiving the pivot axle 28. FIGS. 5 and 6 show that, in the lever 24, as contrasted to the lever 25, the lever arms 26 and 29 are at an angle to each other, wherein the connection between the two lever arms is effected via bosses 35 which laterally extend over the bushing 34 when the tensioning clamp is assembled and which are likewise penetrated by the pivot axle 28 lying, when the tensioning clamp is assembled, in alignment with the bushing 34.

Corresponding to the spacing of the lever arms 29, 30 with respect to each other and the deflection of the belt 33, over the belt mountings 31, 32 associated with the lever arms 29, 30, a tightening of the clamping jaws 26, 27 with respect to each other results in dependence on the load of the belt 33, by means of which tightening the tightening element 23 is fixed with regard to the guide means 22. The guide means 22 which, as mentioned above, can be constituted in this embodiment by means of a textile strap or the like, extends between the clamping jaws 26, 27 and is deflected in the zone of the pivot axle 28 on the outside by the bushing 34 and is guided away in the direction of the lever arm 30.

To secure the position of the clamping or tightening element 23 with respect to the guide means 22, it is also possible in this embodiment, independently of the stress applied through the belt 33, to ensure a certain pretensioning of the clamping jaws 26, 27 with respect to the guide means by bracing the levers resiliently against each other. The resilient bracing action can be attained directly at the clamping jaws, for example through a clamping bracket or also through a tension spring (not shown) located between the lever arms 29, 30.

Figure 7:
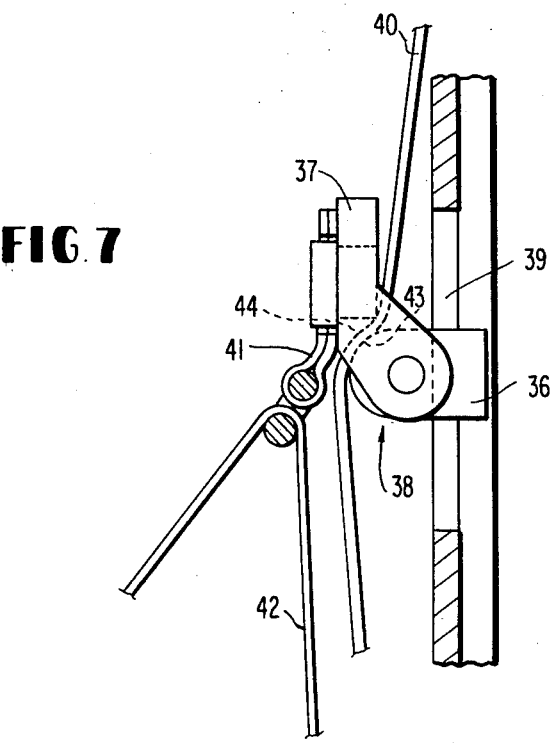
FIG. 7 is a cross-sectional view of yet another embodiment of a belt articulation apparatus in accordance with the present invention.

In FIG. 7 a clamping or tensioning clamp generally designated by the reference number 38 composed of two clamping jaws 36, 37, is provided guided through the clamping jaw 36 in a guide means 39 fixedly attached to the vehicle in a vertically displaceable fashion, but not lockable in position. Between the clamping jaws 36, 37 extends a belt strap 40 serving as the guide element. The clamping jaw 37 has a belt mounting 41 for a safety belt 42, arranged in such a way that when the safety belt 42 is stressed the clamping jaw 37 is pulled downwardly and thus the belt strap 40 is clamped in position between the curved clamping surfaces 43, 44 of the clamping jaws 36, 37, so that a vertical locking of the tensioning clamp 38 takes place. The belt mounting 41 here can be fashioned as a commercially available deflection fitting threadedly joined to the clamping jaw 37.

A certain clamping effect under normal operation is attained already by the inherent weight of the clamping jaw 37 and the belt mounting 41 connected therewith, so that a sliding off of the clamping or tensioning clamp 38 is avoided in any event.

The belt articulations designed in accordance with this invention and explained with reference to the schematic embodiments make it possible to effect a preferably infinitely variable adjustment and preferably one which can be conducted without the use of tools, and they are especially suitable for the top articulation points in three-point automatic belts. The belt articulations of this invention are either at least extensively hidden, in a conventional way, for example in middle pillars of vehicles or also can be mounted to such pillars. In particular, it is also possible to mount them subsequently, wherein the belt articulation fashioned according to this invention particularly suitable also for utility vehicles. The invention can also be advantageously employed in other slanted shoulder belt arrangements.

We claim:

1. A position-variable belt articulation apparatus for a vehicle safety belt, especially for an upper articulation point at a side of a vehicle in a three-point safety belt system, characterized in that the articulation apparatus comprises a guide means, a clamping element displaceable in a longitudinal direction along the guide means, at least one belt mounting connected with said clamping element, said at least one belt mounting is stressed by the belt in dependence upon a load imposed upon the belt, and in that said clamping element is pivotable about an axis extending at right angles to the displacement direction upon a stressing of the at least one belt mounting, whereby the clamping element is clamped against the guide means by the load imposed on the belt.

2. A belt articulation apparatus according to claim 1, characterized in that the clamping element is fashioned as a two-armed lever, a clamping jaw cooperating with the guide means is provided on one arm of the lever, and the belt mount is provided on the other arm of the lever.

3. A belt articulation apparatus according to claim 1, characterized in that the at least one belt mounting is in a guide loop of the belt.

4. A belt articulation apparatus according to claim 1, characterized in that the at least one belt mounting is formed by a guide eye.

5. A belt articulation apparatus according to claim 1, wherein the guide means is affixed to the vehicle and a belt strap serves as a guide element, characterized in that a first clamping jaw is provided, the clamping element includes a second clamping jaw hingedly joined to the first clamping jaw, the belt strap is disposed between the first and second clamping jaws so as to be clamped therebetween, and in that said second clamping jaw is displaceably guided in the guide means affixed to the vehicle so as to be vertically displaceable, the at least one belt mounting is connected with the first clamping jaw whereby a stress on the belt mounting due to a load on the safety belt effects a fixed clamping of the belt strap between the first and second clamping jaws.

6. A belt articulation apparatus according to claim 5, characterized in that each clamping jaw has a curved clamping surface, and wherein the clamping surface of said second clamping jaw is convex and the clamping surface of the first clamping jaw is concave.

7. A position-variable belt articulation apparatus for a vehicle safety belt, especially for an upper articulation point at a side of the vehicle in a three point safety belt system, characterized in that the articulation apparatus comprises a clamping element adjustable along a guide means, belt mounts are connected with the clamping element, said belt mounts are stressed against the guide means by the belt in dependence upon a load imposed upon the belt, and in that the clamping element includes clamping jaws associated with the belt mounts, the guide means are disposed between the clamping jaws, said clamping jaws are acted upon and stressable by the belt in dependence upon a load exerted thereon so as to be clamped against the guide means disposed therebetween.

8. A belt articulation apparatus according to claim 7, characterized in that the clamping element includes intersecting levers, means are provided for pivoting the levers relative to each other about a pivot axle, the clamping jaws are provided on the levers on one side of the pivot axle and the belt mountings are provided on the other side of the pivot axle.

9. A belt articulation apparatus according to claim 8, characterized in that one of the levers of the clamping element is straight and the other of the levers is angled in a zone of the pivot axle.

10. A belt articulation apparatus according to claim 8, characterized in that means are provided for pretensioning the clamping jaws against the guide means.

11. A belt articulation apparatus according to claim 10, characterized in that the pretensioning means includes a tension spring arranged between the levers of the clamping element.

12. A belt articulation apparatus according to one of claims 8, 9, 11 or 7, characterized in that the guide means is a belt strap.

13. A belt articulation apparatus according to one of claims 8 or 7, characterized in that the belt mounts are each formed by a guide eye.

14. A belt articulation apparatus according to claim 7, characterized in that the belt mountings are in a guide loop of the t.

* * * * *